(12) United States Patent
Boehnke

(10) Patent No.: US 7,066,726 B2
(45) Date of Patent: Jun. 27, 2006

(54) DEVICE AND METHOD FOR MELTING AND CONVEYING MATERIAL

(75) Inventor: Christian Boehnke, Münster (DE)

(73) Assignee: Hengst GmbH & Co. KG (DE)

( * ) Notice: Subject to any disclaimer, the term of this patent is extended or adjusted under 35 U.S.C. 154(b) by 351 days.

(21) Appl. No.: 10/070,562

(22) PCT Filed: Jun. 30, 2001

(86) PCT No.: PCT/DE01/02485

§ 371 (c)(1),
(2), (4) Date: Jul. 10, 2002

(87) PCT Pub. No.: WO02/04146

PCT Pub. Date: Jan. 17, 2002

(65) Prior Publication Data

US 2003/0071028 A1    Apr. 17, 2003

(51) Int. Cl.
*B29C 31/02* (2006.01)
*B29C 45/18* (2006.01)
*B29C 45/20* (2006.01)

(52) U.S. Cl. .................. 425/549; 425/547; 164/250.1; 264/328.15

(58) Field of Classification Search ................ 264/349, 264/328.15, 328.1, 328.14; 425/547, 549, 425/542, 561, 562, 564; 219/388, 405; 164/312, 164/507, 250.1, 271
See application file for complete search history.

(56) References Cited

U.S. PATENT DOCUMENTS 4,230,934 A * 10/1980 ter Beek et al. ............ 219/421
4,373,132 A * 2/1983 Vartanian .................... 219/421
5,143,733 A * 9/1992 Von Buren et al. ......... 425/130
5,208,052 A * 5/1993 Schmidt et al. ............. 425/549
5,501,594 A * 3/1996 Glozer et al. ............... 425/549
6,135,196 A * 10/2000 Kono ......................... 164/113

FOREIGN PATENT DOCUMENTS

CH          399 730         9/1965
DE       36 40 370 C2       5/1987

(Continued)

OTHER PUBLICATIONS

Giesstechnik Special: "Thermoregulierung von Füllkammern . . . "in: Aluminum, 73, 1997, 6, S.382/383.

*Primary Examiner*—Sue A. Purvis
(74) *Attorney, Agent, or Firm*—Lahive & Cockfield, LLP

(57) ABSTRACT

The invention relates to a device for melting and conveying material such as plastic or metal. Said device comprises a conveying channel, which contains an admission opening for the material as well as a discharge opening for the at least partially melted material. The device also comprises heating devices that, between the admission opening and discharge opening, heat the conveying channel and/or the material, and comprises a slide that can move to-and-fro while conveying the material from the admission opening to the discharge opening. According to the invention, the conveying channel is provided with a tubular shape and with two walls and has an inner tube and an outer tube. The slide is provided as a sliding sleeve, which is placed between the inner tube and the outer tube, and is provided in two pieces. In addition, said slide comprises a closing sleeve for opening or closing the conveying channel and comprises a conveying sleeve that can be moved independent of the closing sleeve.

5 Claims, 2 Drawing Sheets

FOREIGN PATENT DOCUMENTS

| | | |
|---|---|---|
| EP | 904 875 A1 | 3/1999 |
| EP | 808 680 B1 | 8/1999 |
| EP | 778 099 B1 | 11/2001 |
| WO | WO 99/50007 | 10/1999 |

* cited by examiner

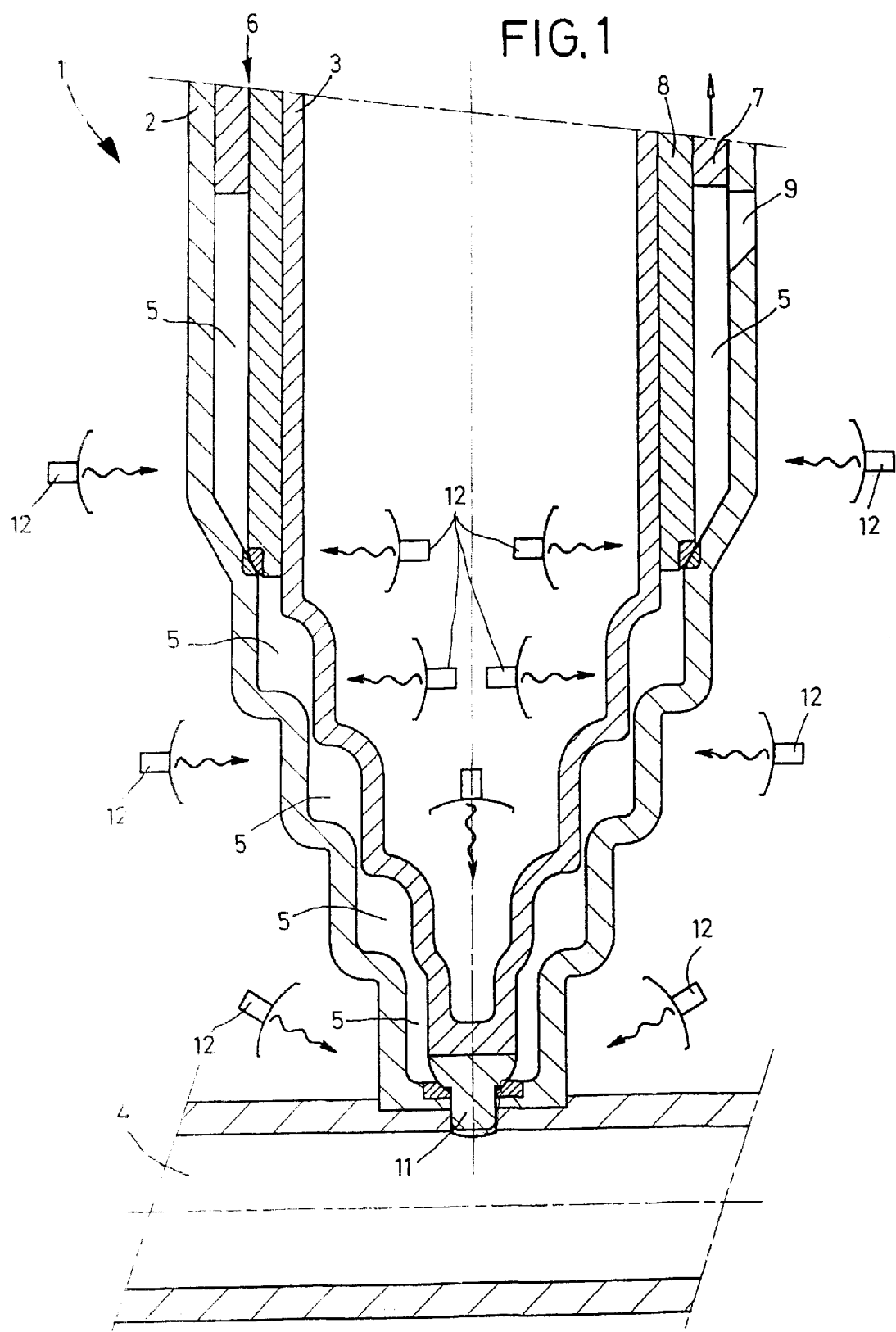

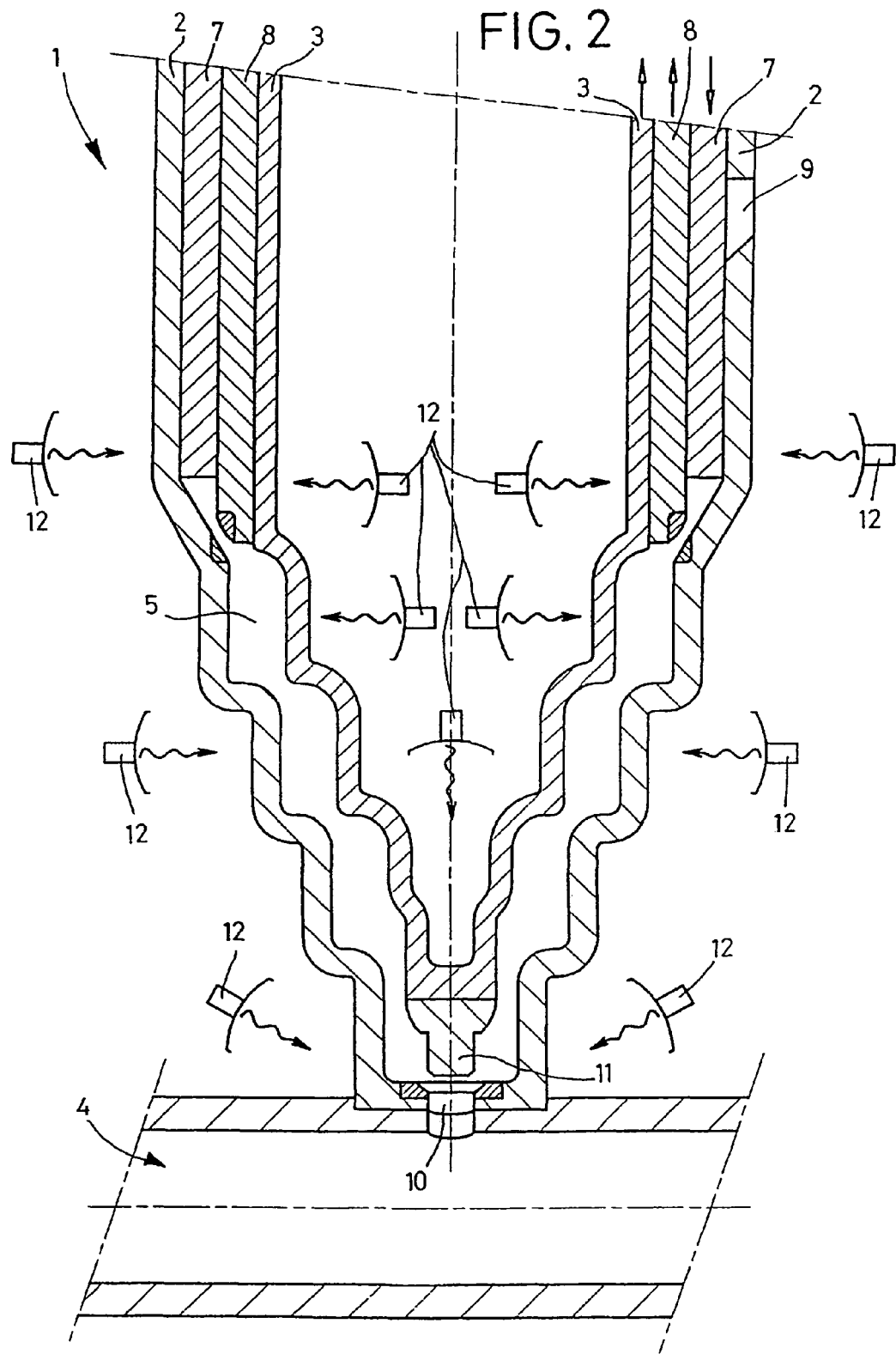

DEVICE AND METHOD FOR MELTING AND CONVEYING MATERIAL

RELATED APPLICATIONS

This application is a 35 U.S.C. 371 national stage filing of, and claims priority to, International Application No. PCT/DE01/02485, filed Jun. 30, 2001, which in turn claims priority to German Patent Application No. 100 33 165.3 filed on Jul. 7, 2000 in Germany. The contents of the aforementioned applications are hereby incorporated by reference.

The invention relates to a device according to the preamble of claim 1 and a method according to the preamble of claim 6.

Devices and methods according to the species are known from German Patent 36 40 370 C2, European Patent 778 099 A3, European Patent 904 875 A1 or World Patent 99/50007.

For example, a known approach used with injection molding equipment is to both convey and melt the plastic within the screw conveyors. The internal friction of the plastic has the effect that a large component of the energy to be utilized for melting is introduced into the material. Usually an additional heating means is provided outside the conveying channel.

In the case of metals, the internal friction component contributes much less to the heating process than is the case with plastics. Here the conveyor screw predominantly serves the purpose of simply conveying the material. Providing the energy required to melt the material to these devices may be problematic where such conveying equipment is employed with the dimensions or designs common, for example, in plastics processing.

In this case, the only possibility is to introduce "external" heating capacity—in contrast to "internal" heating through internal friction—from outside the conveying channel. The energy component imparted by the screw conveyor to melt the material is insufficient, when processing metals, to provide a rapid, and specifically, a reliably uniform melting of the metals. With this type of equipment or methods, the situation often arises in which the metal in the very interior of the conveying channel is undesirably cold, and accordingly undesirably hard, while within the outer region of the conveying channel where the external heating has its greatest effect, the metal has already been melted or heated to an undesirably high degree—thus creating an overall undesirably inhomogeneous phase mixture of the metal.

When a slide replaces a rotating screw conveyor in the device according to the species, the effects of internal material friction, such as those produced by kneading or stirring actions, are largely eliminated. There is thus hardly any introduction of heat into the material to be melted from the conveying device but only from the heating equipment such that the melting process may be controlled simply and extremely precisely by this heating equipment independently of the conveying function which is performed by the slide. Heating and conveying may thus be controlled as functions which are essentially independent of one another.

The goal of the invention is thus to provide a device and a procedure for melting and conveying material by which both plastics and metals may be readily processed and in which the most homogenous phase mixture possible of solid and/or liquid material components may be obtained.

This goal is achieved by a device with the characteristic features of claim 1 and by a method with the characteristic features of claim 6.

The invention proposes the approach in which the slide is located in a conveying channel formed between an internal tube and an external tube. The conveying channel has a tubular and double-walled design which produces an annular space as the cross section of the actual channel between the internal tube and external tube, through which channel the material is conveyed, the annular shape being alternatively circular, oval or polygonal. This feature allows the heating to be located either internally or externally, for example, by contact or radiant heating.

Specifically, if the component designated as the "internal tube" of the conveying channel is not in fact a tube but is instead designed as a solid bar-type or cylindrical body, heating cartridges, for example, may be provided inside this body such that this "internal tube" furnishes uniform heating of the conveying channel from within. This design is appropriate, for example, for equipment of smaller dimensions in which it would be difficult to locate radiant heaters, for example, inside the internal tube.

In the case of the conveying channel with the annular design in which the space for the material has an annular cross section, the invention provides that a sliding sleeve be employed as the slide. The cross section of the sleeve may thus be matched to the annular cross section of the conveying channel, thereby allowing the material to be conveyed over the entire cross section of the space of the conveying channel and the most uniform flow conditions possible to be obtained.

According to the invention, the sliding sleeve has a two-part design: it has first a closing sleeve by which a connection between the admission opening and the conveying channel may be interrupted, either, directly at the admission opening or further inside the conveying channel. Secondly, the sliding sleeve has a conveying sleeve which moves so as to convey the material within the conveying channel. These two components may be moved independently of one another to regulate the conveying processes and pressure conditions within the conveying channel as desired.

Alternatively, a plurality of longitudinal, possibly rod-shaped slides, may be provided within the annular space of the conveying channel such that conveying conditions may be individually regulated along the extent of the conveying channel by controlling these individual, possible rod-shaped slides independently of one another.

The conveying channel may advantageously have staged modifications in diameter. In this case, the internal tube may be axially movable relative to the external tube such that when the two tubes are extended, a continuous space is created from the admission opening to the discharge opening such that as the slide is moved the material is conveyed through the conveying channel. Conversely, when the internal and external tubes are moved together, they may form constrictions or actually abut one another in the region in which the individual stages are made.

The result is that individual chambers are formed in the respective diameter stages between which conveyance of the material is impeded or almost completely prevented. The conveyance of the material may thus be advantageously regulated in conjunction with the movements of the sliding sleeves, while the proximity of the internal and external tubes may be intentionally utilized to create shearing movements in the material such that, for example, any dendrites of the still-solid metal components in the process metals may be intentionally broken up. In addition, the pressure within the material to be melted may be regulated by actuating the sliding sleeve when the internal and external tubes are pushed together, i.e., when the material flow in the conveying channel is impeded.

The discharge opening may advantageously be provided in one of the two tubes of the tubular, double-walled conveying channel, for example, in the external tube. The other tube, i.e., the internal tube, for example, may form a closing plug for this discharge opening. Utilizing the above-mentioned movability of the tubes, the internal space of the conveying channel may easily be closed relative to external conditions.

When the device is, for example, connected to a casting machine or injection-molding machine working under relatively high pressures, the conveying device may be pressure-sealed relative to the actual injection device simply by closing the two tubes of the conveying channel relative to each other. Neither the material in the melting and conveying device nor the components of this device then has to be exposed to the undesirably high peak pressures of the injection device. A separation between conveyance, on the one hand, and pressing or injection forces, on the other hand, is easily accomplished, such forces, for example, being prevalent in the injection channel of an attached downstream material processing unit.

In the case of a tubular design for the conveying channel, a circular cross-sectional geometry may be advantageously provided. This approach allows for the production of especially inexpensive components for the device. It also allows for a uniform distribution of the forces acting on the individual components—with a positive effect on the durability and reliability of the device. In addition, it enables uniform heating while precluding zones at especially high or especially low temperature levels. Finally, this circular cross-sectional geometry allows for rotary movements between the individual components, thereby always guaranteeing or creating, for example, a tight seal at the sealing interfaces of these components, and permitting cooled residues of the material which might degrade this tight seal to be removed by means of these rotary movements.

If required, the surfaces of the double-walled conveying channel may be coated or provided with ribs or the like in order to facilitate a higher input of energy into the conveying channel, and thus especially intensive heating.

The following discussion explains the invention in more detailed based on a purely schematic drawing.

FIG. 1 shows a device for melting and conveying material, the admission opening being open and the discharge opening being closed.

FIG. 2 shows the device in FIG. 1 with the admission opening closed and the discharge opening open.

In the drawing number 1 designates in general a device shown purely schematically and in cross section, the function of the device being conveyance and melting. Device 1 has an external tube 2 and an internal tube 3, these two internal and external tubes 2 and 3 first running cylindrically and coaxially in the direction of conveyance, then being reduced by stages in their respective diameters. At its lower end, device 1 adjoins an injection channel 4 which, for example, feeds the molten material to an automated casting machine, only a section of which is shown. An injection piston may be provided in injection channel 4, which injection piston is not seen due to the purely schematic rendering of the drawing.

A space is created between external tube 2 and internal tube 3 to form an annular conveying channel 5 for the material. A slide is provided in the section of conveying channel 5 in which internal tubes 2 and 3 are cylindrical, said slide being designed as a two-part sliding sleeve, a radially disposed external conveying sleeve 7 being provided, and a radially disposed internal closing sleeve 8 also being provided which in FIG. 1 closes conveying channel 5. The axial movement of conveying sleeve 7 allows admission opening 9 in external tube 2 to be opened or closed as desired. FIG. 1 shows the opening position for conveying sleeve 7 in which admission opening 9 to conveying channel 5 is open.

FIG. 1 also shows that external and internal tubes 2 and 3 are arranged in a telescoped configuration such that in the region of the staged reductions in cross section external and internal tubes 2 and 3 each form a narrowing of conveying channel 5 at these sites, at which narrowing the free flow of material is impeded.

In the arrangement shown in FIG. 1, the radial internal closing sleeve 8 is in its closing position in which it adjoins external tube 2 to form a seal, while the radial external conveying sleeve 7 is situated simultaneously in its raised position, thereby opening admission opening 9. Material may enter conveying channel 5, at least in its upper interval.

Subsequent to this operating situation shown in FIG. 1, conveying sleeve 7 may be lowered so that first admission opening 9 is closed, and then the material located in the upper section of conveying channel 5 may be compacted. This material may, for example, initially be in granular form.

As the operation continues, closing sleeve 8 is raised, as is evident in FIG. 2, so that it is separated from external tube 2, thereby allowing the material in the upper section of conveying channel 5 to enter the staged, diameter-reduced sections of conveying channel 5. For this purpose, conveying sleeve 7 is moved downward to its lower end position as seen in FIG. 2.

In the process, external and internal tubes 2 and 3 are moved relative to each other, while internal tube 3 is raised. As a result, the narrowings of the conveying channel 5 formed at the edges of the stages, visible in FIG. 1, are enlarged, thereby allowing the material to be readily conveyed to the increasingly smaller diameters of conveying channel 5.

All of the axial movements of internal tube 3, of conveying sleeve 7 and of closing sleeve 8 may be effected either as purely translational motions or as combined translational and rotational motions, for example, for the purpose of reliably freeing the individual components from adhering residual material and thus ensuring, for example, a reliable seal between individual components.

With internal tube 3 in the raised position shown in FIG. 2, discharge opening 10 is opened which is formed in external tube 2 and may be closed by a plug 11, as seen in FIG. 1, this plug 11 being provided at the lower end of internal tube 3.

Due to the fact that discharge opening 10 is closable by plug 11, significant pressures may build up in injection channel 4 without these pressure peaks extending into conveying channel 5. This feature protects the melting and conveying device 1 while not affecting the pressure characteristic in the actual injection device, with the result that the pressure characteristic may be better controlled than would be the case if a connection existed leading from the injection device leading into melting and conveying device 1.

Heating devices 12 in the form of radiant heaters are arranged both radially outside external tube 2 and radially inside internal tube 3 so that conveying channel 5 may be heated from both sides, and thus as intensively as possible. Heating devices 12 are represented only schematically. Other heating devices may be provided in place of radiant heaters, for example, heating coils or the like, which may be mounted as contact heaters internally and externally on internal and external tubes 2 and 3.

Special sealing materials may be provided in the region of the discharge opening 10 for ensure a seal relative to plug 11, and in the lower region of closing sleeve 8, as well as in the adjacent region of external sleeve 2 to ensure a reliable seal at these sealing sites. These special sealing materials are likewise indicated in the drawings only schematically.

At the location where the stages of internal and external tubes 2 and 3 are almost in contact, no special sealing materials are provided so that when the two internal and external tubes 2 and 3 are in their retracted position (FIG. 1), no seal is actually created between the individual chambers formed in the respective stages. Instead, the reductions in the cross sections of the conveying channel simply create a configuration in which the partially melted material, which may, for example, be present in dendritic form, is sheared to break off the dendrites.

Depending on the material processed, specifically when there is no dendrite problem, the design with the shown staged diameter reductions for conveying channel 5 may be dispensed with and the conveying channel continued either as cylindrical with a constant diameter up to discharge opening 10, or the diameter of conveying channel 5 may be continuously reduced, for example, in the form of a V-shaped pattern for conveying channel 5.

The cross-sectional reduction of the conveying channel, whether continuous or in stages, allows for high conveying rates or high conveying pressures in response to a relatively small movement by the slide, with the result that the material may enter injection channel 4 in one rapid and short-duration injection procedure. In contrast, the material rate in the section of conveying channel 5 with a larger diameter is slower so as to provide a longer period in which to melt the material.

The invention claimed is:

1. Device for melting and conveying a material, comprising
    a conveying channel having an admission opening for the material and a discharge opening for at least partially molten material,
    one or more heating devices for heating one of the conveying channel and the material between the admission opening and the discharge opening, and
    a slide which is reciprocally movable so as to convey the material from the admission opening to the discharge opening, wherein the conveying channel is tubular and has a double-walled configuration including an internal tube and an external tube, the slide being designed as a sliding sleeve which is located between the internal tube and the external tube, and wherein the slide includes a closing sleeve to close or open the conveying channel and a conveying sleeve which is movable independently of the closing sleeve.

2. Device according to claim 1, wherein the conveying channel is reduced from a first diameter in a region of the admission opening to a smaller diameter in a region of the discharge opening, wherein the internal and external tubes of the conveying channel are axially movable toward each other, between a conveying position in which passage between the internal tube and the external tube is achieved, and a closing position in which the internal and external tubes are in close proximity to each other such that a material flow between the tubes is impeded.

3. Device according to claim 1, wherein one of the internal and external tubes forms a plug for the discharge opening formed by the other tube, wherein the tubes are movable toward each other between an opening position and a closing position to open or close the discharge opening.

4. Device according to claim 1, wherein the internal tube of the conveying channel is a solid, rod-type or cylindrical component.

5. Device according to claim 1, wherein the heating device is arranged at least one of radially inside and radially outside the conveying channel.

* * * * *